United States Patent
Jeon et al.

(10) Patent No.: US 11,667,014 B2
(45) Date of Patent: Jun. 6, 2023

(54) JIG FOR COVER WINDOW

(71) Applicant: Samsung Display Co., Ltd., Yongin-si (KR)

(72) Inventors: Yusik Jeon, Hwaseong-si (KR); Beomgyu Choi, Seoul (KR); Jinnyoung Heo, Yongin-si (KR); Gyuin Shim, Yongin-si (KR); Dongwoon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 713 days.

(21) Appl. No.: 16/657,750

(22) Filed: Oct. 18, 2019

(65) Prior Publication Data
US 2020/0147761 A1  May 14, 2020

(30) Foreign Application Priority Data
Nov. 12, 2018  (KR) .......................... 10-2018-0138074

(51) Int. Cl.
*B25B 11/02* (2006.01)
*C03C 17/00* (2006.01)
*B24B 41/06* (2012.01)

(52) U.S. Cl.
CPC .............. *B25B 11/02* (2013.01); *B24B 41/06* (2013.01); *C03C 17/002* (2013.01); *G06F 2203/04103* (2013.01)

(58) Field of Classification Search
CPC ......... B25B 11/02; B25B 5/145; B25B 11/00; B25B 11/007; G02F 1/1333; G02F 1/133308; G02F 2201/46; G06F 2203/04103; C25D 17/06; B23Q 3/00;
(Continued)

(56) References Cited

U.S. PATENT DOCUMENTS 3,730,511 A * 5/1973 Caras ........................ B25B 5/10
269/224
4,923,552 A * 5/1990 Fukushima ........... G02F 1/1339
156/273.7
(Continued)

FOREIGN PATENT DOCUMENTS

CN       101470046 A     7/2009
CN       205105269 U     3/2016
(Continued)

OTHER PUBLICATIONS

Chinese Office action dated Aug. 26, 2022, in corresponding Chinese Patent Application No. 201911098940.8 (7 pages).

*Primary Examiner* — Joseph J Hail
*Assistant Examiner* — Arman Milanian
(74) *Attorney, Agent, or Firm* — Lewis Roca Rothgerber Christie LLP

(57) ABSTRACT

A jig for a cover window may include a lower jig and an upper jig on the lower jig. The lower jig may include a mounting portion, on which a cover window is configured to be disposed, and an exhausting portion adjacent to the mounting portion. The upper jig may include a cover unit, in which an opening exposing the mounting portion is defined, and a sidewall portion, coupled to the cover unit and enclosing the lower jig. The cover unit may be spaced apart from and overlapped with the exhausting portion.

20 Claims, 12 Drawing Sheets

(58) Field of Classification Search
CPC . B23Q 3/06; B23Q 3/154; B23P 11/00; B23P 11/027; B23P 19/00; B23P 19/04
USPC ......... 269/17, 37, 136, 137, 138, 289 r, 309, 269/310, 903, 905
See application file for complete search history.

(56) References Cited

U.S. PATENT DOCUMENTS

| | | | | |
|---|---|---|---|---|
| 7,889,311 | B2 * | 2/2011 | Lee | G02F 1/1309 |
| | | | | 349/192 |
| 8,136,805 | B1 * | 3/2012 | Lee | G11B 5/3173 |
| | | | | 125/35 |
| 8,216,380 | B2 | 7/2012 | White et al. | |
| 8,864,965 | B2 * | 10/2014 | Fujikata | C25D 17/001 |
| | | | | 269/134 |
| 9,406,698 | B2 * | 8/2016 | Yamazaki | G02F 1/1339 |
| 10,194,538 | B2 | 1/2019 | Lee et al. | |
| 10,212,865 | B2 | 2/2019 | Son et al. | |
| 10,274,658 | B2 | 4/2019 | Kim et al. | |
| 2011/0247658 | A1 * | 10/2011 | Kwak | B08B 5/04 |
| | | | | 15/300.1 |
| 2014/0020720 | A1 * | 1/2014 | Fujikata | C25D 21/08 |
| | | | | 134/34 |
| 2015/0059159 | A1 * | 3/2015 | Ho | B25H 1/02 |
| | | | | 29/559 |
| 2019/0299369 | A1 * | 10/2019 | Lee | G02F 1/133528 |

FOREIGN PATENT DOCUMENTS

| | | |
|---|---|---|
| CN | 108172119 A | 6/2018 |
| CN | 207502906 U | 6/2018 |
| CN | 108282562 A | 7/2018 |
| JP | 2013255020 | 12/2013 |
| KR | 10-2006-0007831 A | 1/2006 |
| KR | 10-0758386 B1 | 9/2007 |
| KR | 10-0918495 B1 | 9/2009 |
| KR | 10-2011-0106871 A | 9/2011 |
| KR | 10-2013-0037130 A | 4/2013 |
| KR | 10-2014-0028901 A | 3/2014 |
| KR | 10-2016-0095250 A | 8/2016 |
| KR | 10-2017-0106550 A | 9/2017 |
| KR | 10-1826738 B1 | 2/2018 |

* cited by examiner

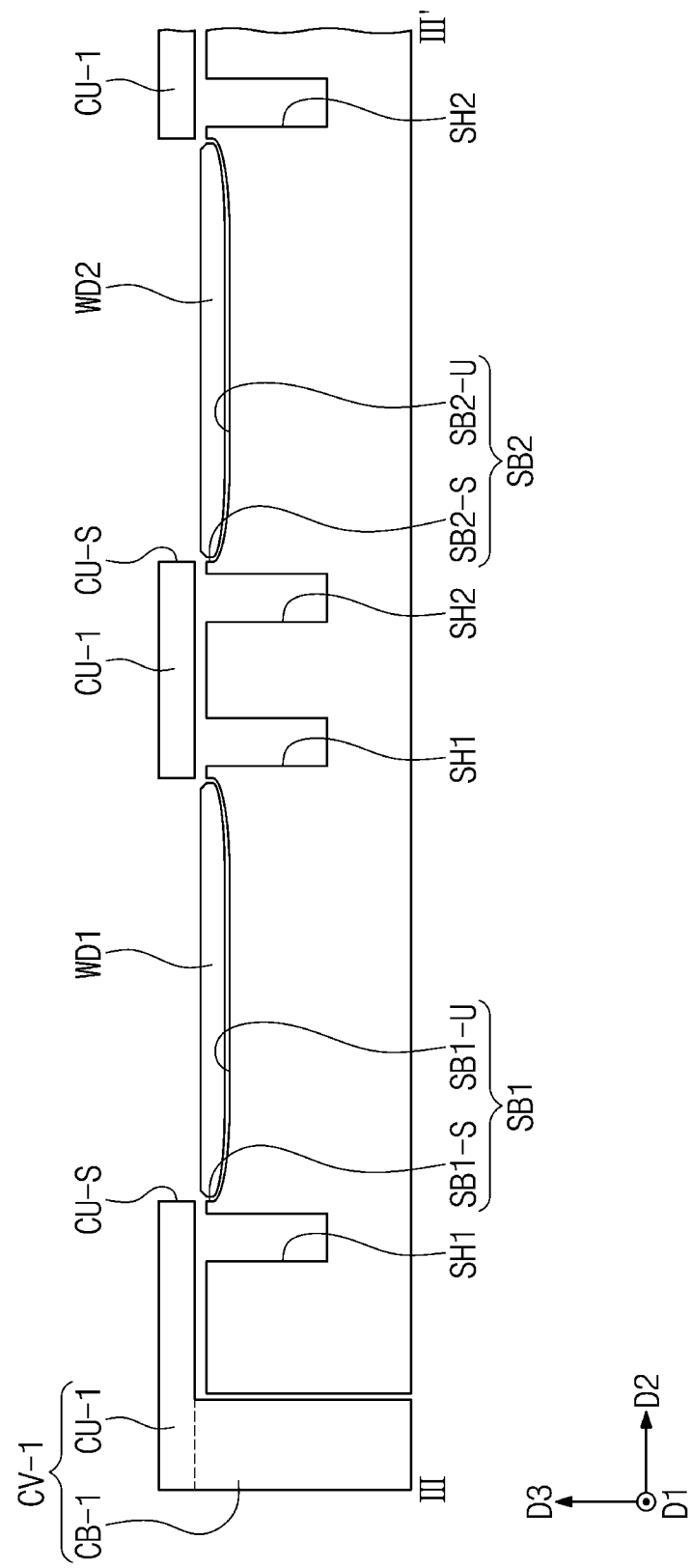

JIG FOR COVER WINDOW

CROSS-REFERENCE TO RELATED APPLICATIONS

This application claims priority to and the benefit of Korean Patent Application No. 10-2018-0138074, filed on Nov. 12, 2018, in the Korean Intellectual Property Office, the entire content of which is hereby incorporated by reference.

BACKGROUND

One or more aspects of embodiments of the present disclosure are directed toward a jig for a cover window, and in particular, toward a highly reliable jig for a cover window.

A mobile apparatus, such as, for example, a cellular phone, includes a display panel, which includes pixels and can display an image, and a cover window for protecting the display panel. The display panel may include a liquid crystal display panel or an organic light emitting display panel. An image displayed on the display panel is provided to a user (viewer) through the cover window.

The cover window includes various functional layers (e.g., for improving durability and/or providing an anti-fingerprint function), which may be formed by a printing process. In the case where a printing process is performed on the cover window, a jig is disposed (positioned) on a front or rear surface of the cover window to uniformly form a layer on the cover window.

SUMMARY

One or more aspects of embodiments of the inventive concept provide for a jig for a cover window, which can improve layer uniformity when the layer is formed on the cover window by a printing process.

According to an embodiment of the inventive concept, a jig for a cover window may include a lower jig and an upper jig coupled with the lower jig. The lower jig may include a mounting portion, on which a cover window is configured to be disposed, and an exhausting portion adjacent to the mounting portion. The upper jig may include a cover unit, in which an opening exposing the mounting portion is defined, and a sidewall portion coupled to the cover unit and enclosing the lower jig. The cover unit may be spaced apart from and overlapped with the exhausting portion.

In an embodiment, a side surface of the mounting portion may be aligned with a side surface of the cover unit, the side surface of the cover unit defining a boundary of the opening.

In an embodiment, a width of the exhausting portion may range from 1.0 mm to 3.0 mm.

In an embodiment, a height of the exhausting portion may range from 3.0 mm to 8.0 mm.

In an embodiment, a width of the side surface of the cover unit may range from 0.5 mm to 1.5 mm.

In an embodiment, the cover window may include a front surface facing the mounting portion, a rear surface opposite the front surface, and a side surface between the front surface and the rear surface, and at least a portion of the front surface includes a curved surface with a set curvature radius.

In an embodiment, the rear surface of the cover window may include a curved surface having a same curvature radius as that of the front surface.

In an embodiment, the cover unit may include a rear surface coupled to the side surface of the cover unit and facing the lower jig. A distance from an imaginary line, which extends from the rear surface of the cover unit, to the rear surface of the cover window may range from 0.1 mm to 0.4 mm.

In an embodiment, the cover unit may further include an inclined surface connecting the side surface of the cover unit to the rear surface of the cover unit and extending toward the exhausting portion.

In an embodiment, the cover window may further include an inclined surface extending along an edge of the cover window, and the inclined surface may connect at least one of the front surface and rear surfaces of the cover window to the side surface thereof.

In an embodiment, the exhausting portion may have a rectangular shape, when viewed in a sectional view.

In an embodiment, the exhausting portion may have a closed line shape enclosing the mounting portion when viewed in a plan view.

According to an embodiment of the inventive concept, a jig for a cover window may include a lower jig including a mounting portion, on which a cover window is configured to be disposed, and an exhausting portion adjacent to the mounting portion, and an upper jig overlapping the exhausting portion. The upper jig may include a cover unit, in which an opening exposing the mounting portion is defined, and a sidewall portion coupled to the cover unit and enclosing the lower jig. The cover unit may be spaced apart from the lower jig.

In an embodiment, a side surface of the mounting portion may be aligned with a side surface of the cover unit, the side surface of the cover unit defining a boundary of the opening.

In an embodiment, the cover window may include a front surface facing the mounting portion, a rear surface opposite the front surface, and a side surface between the front surface to the rear surface, and at least a portion of the front surface includes a curved surface with a set curvature radius.

In an embodiment, the rear surface of the cover window may include a curved surface having a same curvature radius as that of the front surface.

In an embodiment, the exhausting portion encloses the mounting portion and may have a groove shape, which is formed by removing a portion of the lower jig in a depth direction of the lower jig.

According to an embodiment of the inventive concept, a jig for a cover window may include a lower jig including a plurality of mounting portions spaced apart from each other, and a plurality of exhausting portions respectively adjacent to the mounting portions, and an upper jig including a sidewall portion enclosing the lower jig and a cover unit laterally extending from the sidewall portion. The cover unit may have a plurality of openings exposing the respective mounting portions. The exhausting portion may be overlapped with the cover unit.

In an embodiment, a side surface of the mounting portion may be spaced apart from and aligned with a side surface of the cover unit, the side surface of the cover unit defining a boundary of the respective one of the plurality of openings.

In an embodiment, the plurality of openings of the cover unit may be arranged in a grid shape.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIG. 12 is a sectional view taken along a line III-III' of FIG. 10, illustrating a CW jig according to an embodiment of the inventive concept.

Figure 1:
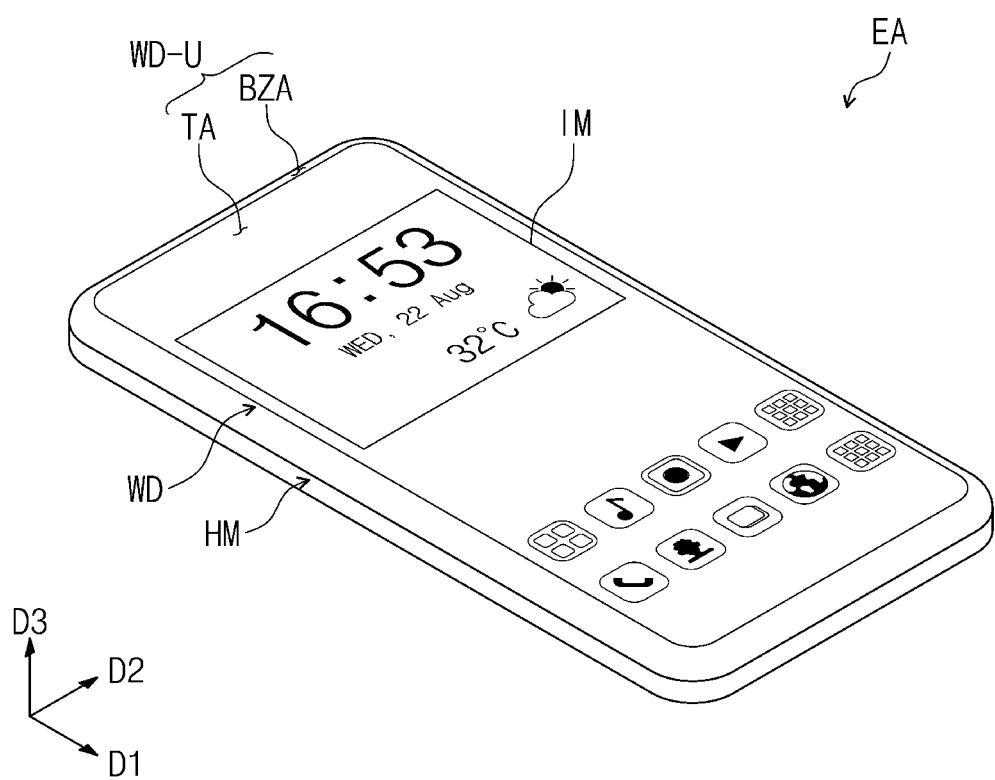
FIG. 1 is a perspective view illustrating an assembled structure of an electronic device according to an embodiment of the inventive concept.

It should be noted that these figures are intended to illustrate the general characteristics of methods, structure and/or materials utilized in example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements in the drawings may be reduced or exaggerated for clarity. The use of similar or identical reference numbers in the various drawings is intended to indicate the presence of a similar or identical element or feature.

DETAILED DESCRIPTION

One or more aspects of embodiments of the inventive concept will now be described more fully with reference to the accompanying drawings, in which example embodiments are shown. Example embodiments of the inventive concept may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements throughout the specification, and duplicative descriptions will not be provided.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

As used herein the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention."

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a first element, component, region, layer and/or section discussed below could be termed a second element, component, region, layer and/or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation of above and below. The device may be otherwise oriented (rotated 90 degrees or at other orientations) and the spatially relative description terms used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concept are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concept should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concept belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used herein, the terms "use," "using," and "used" may be considered synonymous with the terms "utilize," "utilizing," and "utilized," respectively.

In addition, the terms "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Figure 2:
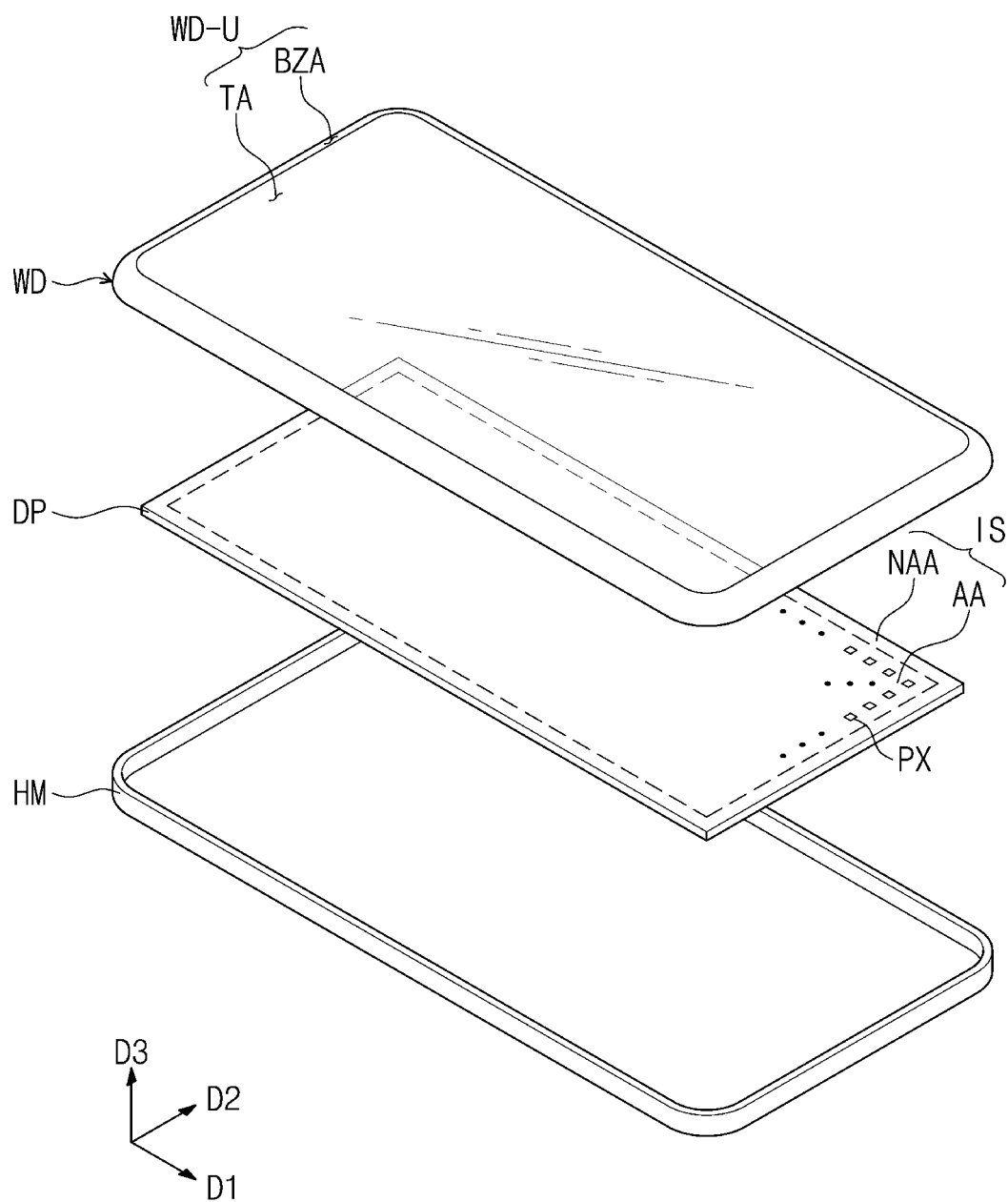
FIG. 2 is an exploded perspective view illustrating an electronic device according to an embodiment of the inventive concept.
Figure 3A:
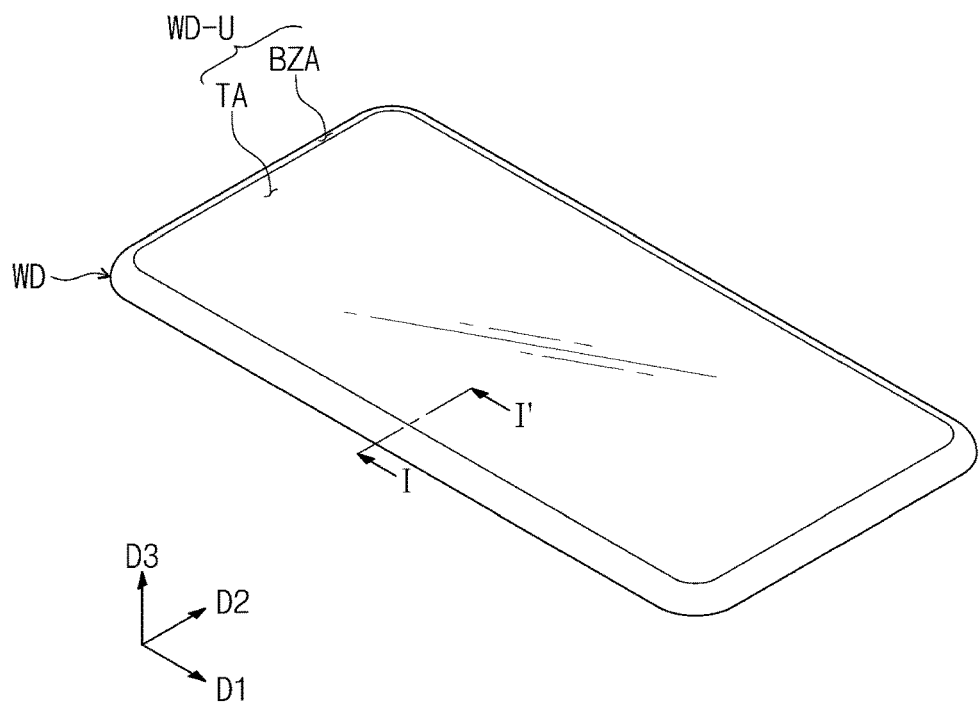
FIG. 3A is a perspective view illustrating a cover window according to an embodiment of the inventive concept.
Figure 3B:
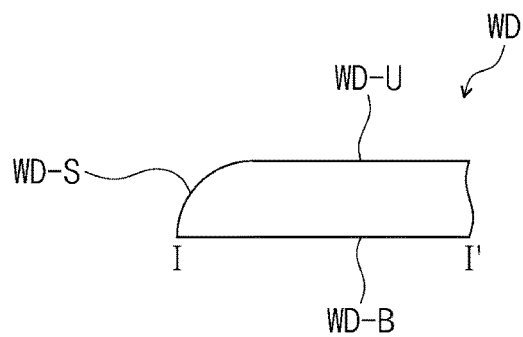
FIG. 3B is a sectional view taken along a line I-I' of FIG. 3A.
Figure 3C:
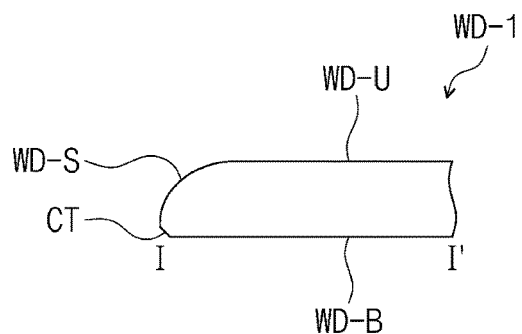
FIG. 3C is a sectional view of a cover window member according to an embodiment of the inventive concept.

FIG. 1 is a perspective view illustrating an assembled structure of an electronic device according to an embodiment of the inventive concept. FIG. 2 is an exploded perspective view illustrating an electronic device according to an embodiment of the inventive concept. FIG. 3A is a perspective view illustrating a cover window of the inventive concept. FIG. 3B is a sectional view taken along a line I-I' of FIG. 3A. FIG. 3C is a sectional view of a cover window member according to an embodiment of the inventive concept. Hereinafter, an electronic device and a cover window according to an embodiment of the inventive concept will be described with reference to FIGS. 1 to 3C.

Referring to FIGS. 1 and 2, an electronic device EA may display an image IM in a third direction D3 that is normal to a plane defined by a first direction D1 and a second direction D2. The electronic device EA may include a cover window WD, a display panel DP, and a housing member HM.

The cover window WD may be optically transparent. For example, the cover window WD may be formed of or include glass and/or plastic. The cover window WD may have a single- or multi-layered structure. For example, the cover window WD may have a stacked structure including a plurality of plastic films, which are coupled to each other by an adhesive layer, or may have a stacked structure including a glass substrate and a plastic film, which are coupled to each other by an adhesive layer.

The cover window WD may include a front surface WD-U exposed to the outside. The image IM displayed on the display panel DP may be seen by a user through the front surface WD-U. The front surface WD-U of the cover window WD may include a transmission region TA and a bezel region BZA, when viewed in a plan view.

The transmission region TA may be configured to allow an incident light to pass therethrough. The transmission region TA may have a shape corresponding to an active region AA of the display panel DP. For example, the transmission region TA may be overlapped with a front surface of the active region AA or at least a portion of the front surface of the active region AA. The image IM, which is displayed on the active region AA of the display panel DP, may be provided to a user (e.g., may be viewed by a user) through the transmission region TA.

The bezel region BZA may have relatively low optical transmittance, compared with the transmission region TA. The bezel region BZA may define a shape of the transmission region TA. For example, the bezel region BZA may be adjacent to the transmission region TA and may enclose the transmission region TA.

The bezel region BZA may have a predetermined (or set) color. The bezel region BZA may cover a peripheral region NAA of the display panel DP and may prevent or reduce the possibility that the peripheral region NAA will be recognized (e.g., seen) by a user. However, the inventive concept is not limited to this example, and in an embodiment, the bezel region BZA may be omitted from the cover window WD.

The display panel DP may include a front surface IS, on which the image IM is displayed. The front surface IS may include the active region AA and the peripheral region NAA. The image IM may be displayed on the active region AA. The peripheral region NAA may be adjacent to the active region AA.

The display panel DP may include a plurality of pixels PX. Each of the pixels PX may display a light, in response to an electrical signal. The lights displayed by the pixels PX may constitute the image IM.

The electronic device EA according to an embodiment of the inventive concept may further include an electronic module. The electronic module may include various functional modules, which are used to operate the electronic device EA. The electronic module may be electrically connected to the display panel DP through a connector and/or the like. For example, the electronic module may be a camera, a speaker, and/or a light or heat sensing sensor, without limitation.

The housing member HM may be disposed (e.g., positioned) below the display panel DP. The housing member HM may be coupled with the cover window WD to define an outer appearance of the electronic device EA. The housing member HM may include a material having relatively high strength and/or stiffness. For example, the housing member HM may include a plurality of frames and/or plates, each of which is formed of glass, plastic, and/or metallic materials.

The housing member HM may provide (e.g., constitute) a storage space. The display panel DP and electronic module may be disposed in the storage space and may be protected from an external impact.

Referring to FIGS. 3A and 3B, the cover window WD may include a rear surface WD-B and a side surface WD-S, in addition to the front surface WD-U.

The front surface WD-U may be exposed to the outside to allow the image IM displayed on the display panel DP to be seen by a user. The rear surface WD-B may be opposite to the front surface WD-U. The side surface WD-S may be between the front surface WD-U and the rear surface WD-B and may connect the front surface WD-U to the rear surface WD-B.

The side surface WD-S may include a curved surface whose curvature is defined by a specific curvature radius. The curved surface may be extended along an edge of the cover window WD. The curved surface may be located at a region where the side surface WD-S connects to the front surface WD-U. However, the inventive concept is not limited to this example, and in an embodiment, the curved surface may be located at a region where the side surface WD-S connects to the rear surface WD-B.

In an embodiment, because the side surface WD-S includes the curved surface, it may be possible to prevent or reduce an external impact from being concentrated on a local region (e.g., from being localized) and thereby to improve durability of the cover window WD. In embodiments in which the curved surface is located at a region where the side surface WD-S connects to the front surface WD-U, it may also be possible to improve visibility of the cover window WD.

In some embodiments, the cover window WD may further include a functional coating layer. The functional coating layer may be formed by a printing process. In an embodiment, the functional coating layer may include an anti-fingerprint layer, an anti-reflection layer, and/or a hard coating layer.

Referring to FIG. 3C, a cover window WD-1 according to another embodiment of the inventive concept may be substantially similar to the cover window WD described in connection with FIG. 3B, except for further including an inclined surface CT. The inclined surface CT may be extended along an edge of the cover window WD-1. The inclined surface CT may connect (or may extend from) at least one of the front surface WD-U and the rear surface WD-B to the side surface WD-S. Although FIG. 3C illustrates an example of the inclined surface CT connecting (extending from) the rear surface WD-B to the side surface WD-S, the inventive concept is not limited to this example.

In an embodiment, because the cover window WD-1 includes the inclined surface CT formed along the edge thereof, it may be possible to further prevent or reduce an external impact from being concentrated on an edge or corner region of the cover window WD-1. Thus, it may be possible to improve the durability of the cover window WD-1.

Figure 4:
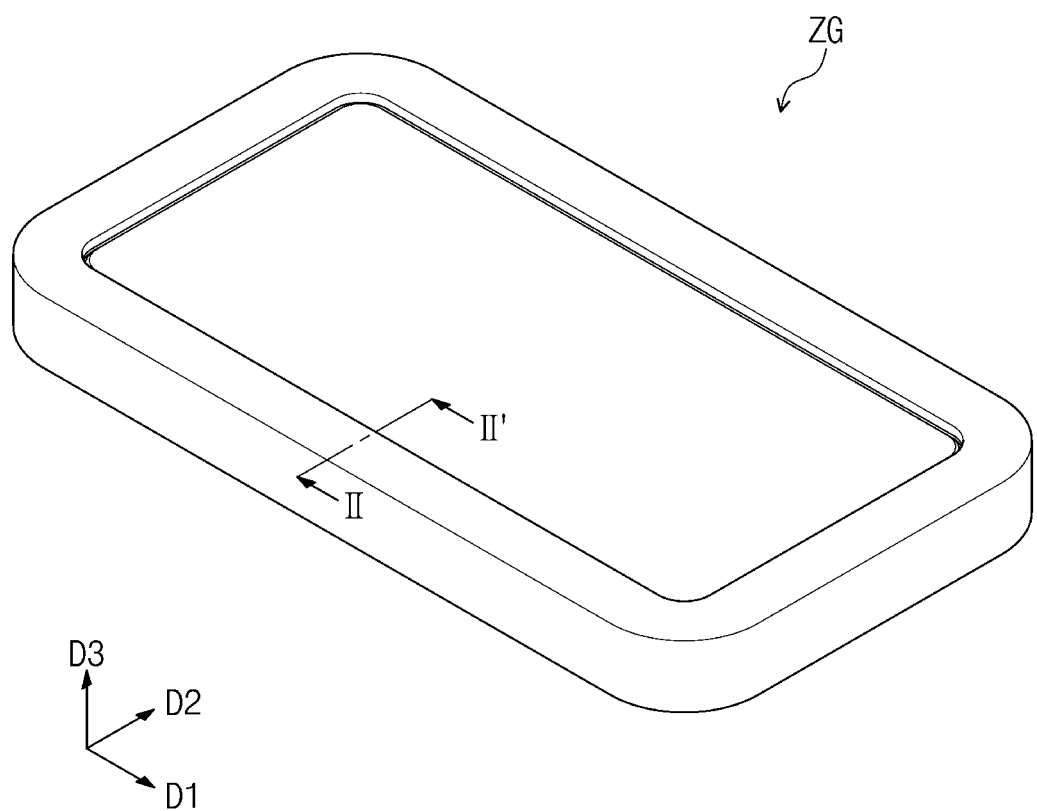
FIG. 4 is a perspective view illustrating an assembled structure of a jig for a cover window (hereinafter, a CW jig), according to an embodiment of the inventive concept.
Figure 5:
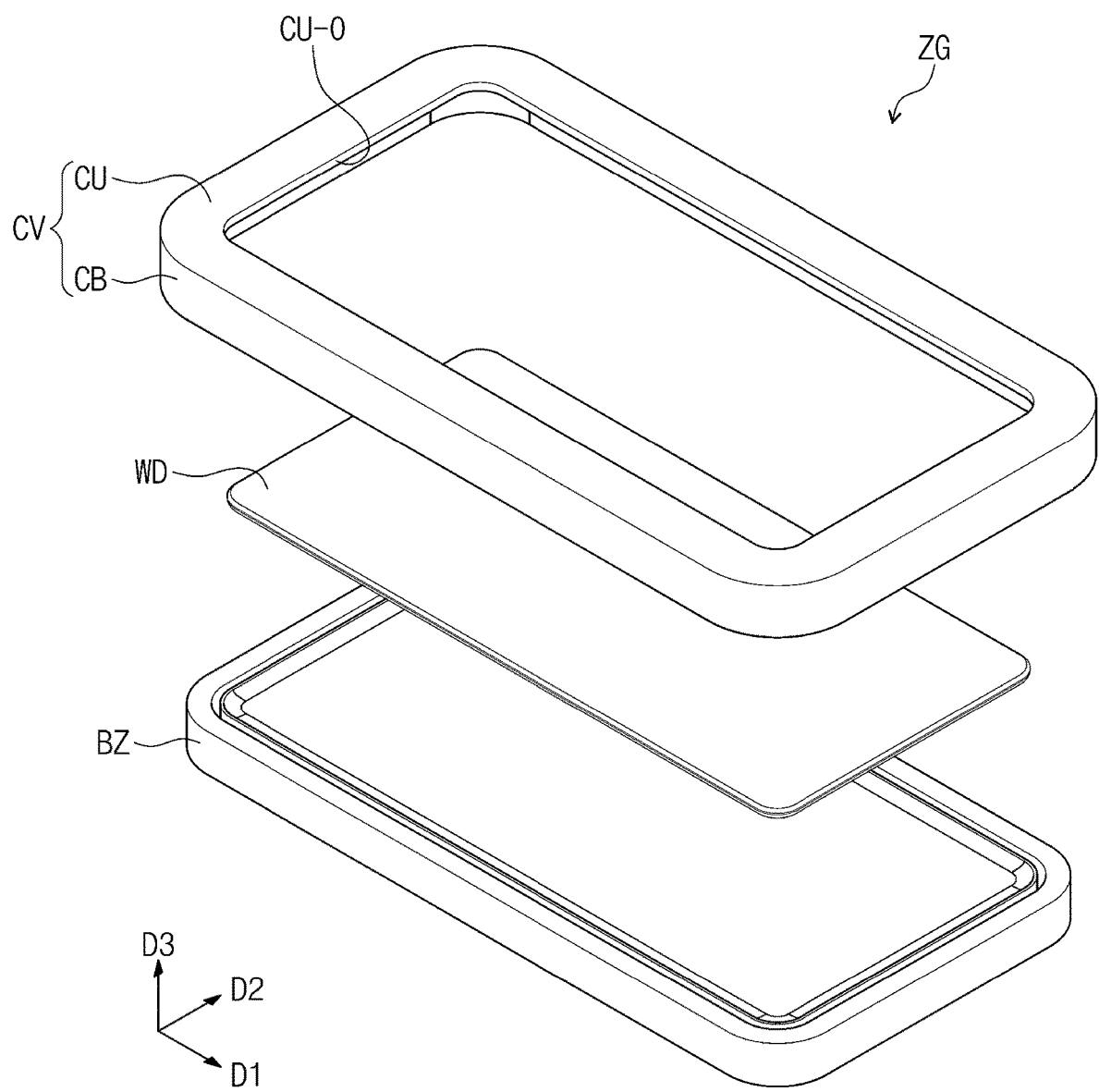
FIG. 5 is an exploded perspective view of a CW jig, according to an embodiment of the inventive concept.
Figure 6:
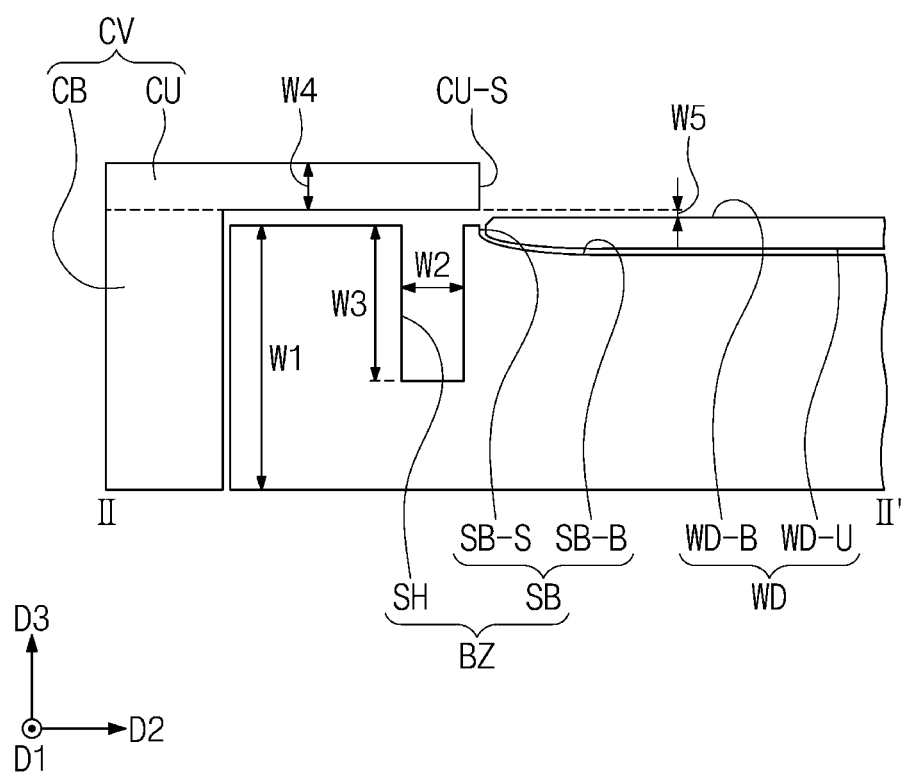
FIG. 6 is a sectional view taken along a line II-II' of FIG. 4.
Figure 7A:
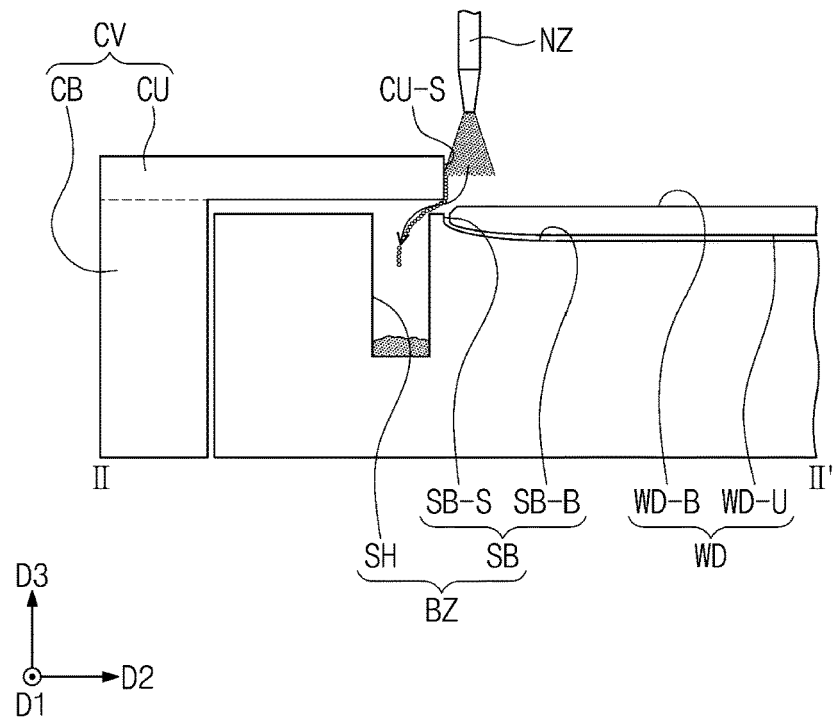
FIGS. 7A and 7B are sectional views illustrating a CW jig according to an embodiment of the inventive concept.
Figure 7B:
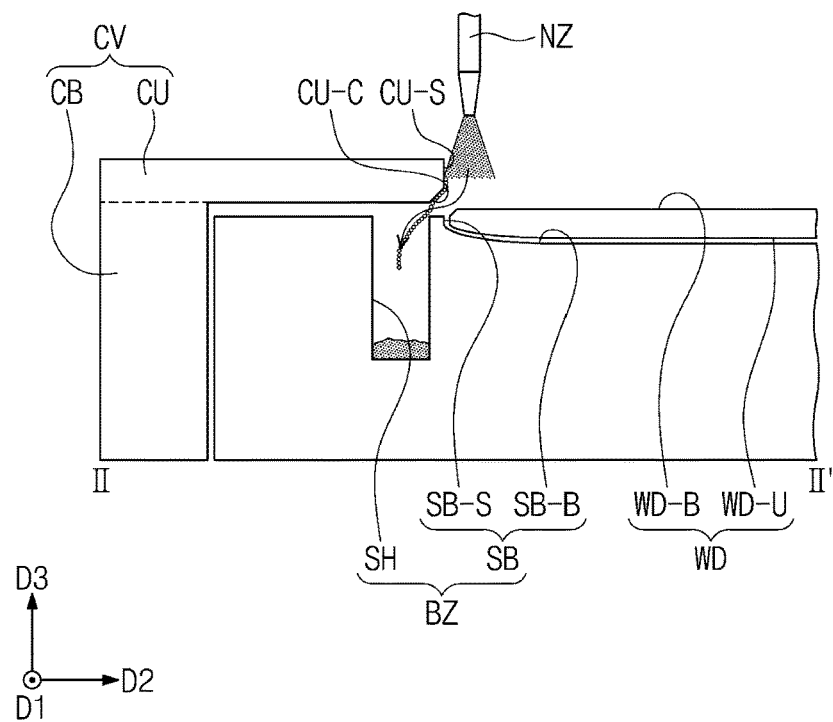

FIG. 4 is a perspective view illustrating an assembled structure of a jig for a cover window (hereinafter, a CW jig), according to an embodiment of the inventive concept. FIG. 5 is an exploded perspective view of a CW jig, according to an embodiment of the inventive concept. FIG. 6 is a sectional view taken along a line II-II' of FIG. 4. FIGS. 7A and 7B are sectional views illustrating a CW jig according to an embodiment of the inventive concept. Hereinafter, a CW jig according to an embodiment of the inventive concept will be described in more detail with reference to FIGS. 4 to 7A.

Referring to FIGS. 4 and 5, a cover window (CW) jig ZG may include a lower jig BZ and an upper jig CV. For convenience in description, both the cover window WD and the CW jig ZG are illustrated in FIG. 5. The cover window WD may be disposed between the lower jig BZ and the upper jig CV, during, for example, a printing process.

Referring to FIG. 6, the lower jig BZ may include a mounting portion SB and an exhausting portion SH. The mounting portion SB may provide a space, on which the cover window WD is mounted. The mounting portion SB may include a mounting surface SB-B and a mounting side surface SB-S. The cover window WD may be disposed on the mounting surface SB-B. When measured in the third direction D3, a thickness W1 of the lower jig BZ (e.g., measured from a rear surface to a top-most surface) may range from 9 cm to 10 cm.

In an embodiment, the mounting surface SB-B of the mounting portion SB may have a shape corresponding to a shape of the surface of the cover window WD that is in contact with the mounting surface SB-B. For example, in the case where the front surface WD-U of the cover window WD is a flat surface and the side surface WD-S is a curved surface with a specific (or set) curvature radius, the mounting surface SB-B may have a flat shape corresponding to the front surface WD-U of the cover window WD and the mounting side surface SB-S may have a curved shape corresponding to the side surface WD-S of the cover window WD. The description that follows will refer to an example, in which the front surface WD-U of the cover window WD is disposed to face the mounting surface SB-B when a printing process is performed.

The exhausting portion SH may be used to store remaining solutions and contamination materials, which are produced during a printing process on the cover window WD. The exhausting portion SH may be disposed adjacent to the mounting portion SB. The exhausting portion SH may be spaced apart from the mounting portion SB and may have a shape enclosing the mounting portion SB. For example, when viewed from the third direction D3 (or in plan view), the exhausting portion SH may have a closed-line shape enclosing (e.g., to surround) the mounting portion SB.

When viewed from the first direction D1, the exhausting portion SH may have a groove shape, which is formed by removing a portion of a top surface of the lower jig BZ in a downward or depth direction parallel to (or along) the third direction D3. For example, the exhausting portion SH may have a rectangular shape, when viewed in a sectional view. However, the inventive concept is not limited to this example or a specific shape of the exhausting portion SH, and the sectional shape of the exhausting portion SH may be any suitable shape so long as the exhausting portion SH has a recessed shape in the downward direction (third direction D3).

When measured in the second direction D2, the exhausting portion SH may have a width W2 ranging from 1.0 mm to 3.0 mm. In the case where the width W2 is less than 1.00 mm, the remaining solutions and the contamination materials, which are produced during a printing process on the cover window WD, may not be easily transported into the exhausting portion SH. In the case where the width W2 is greater than 3.00 mm, the lower jig BZ may have an excessively large width in the second direction D2, which may lead to an unnecessary increase in space and deterioration in productivity of the CW jig ZG.

When measured in the third direction D3, the exhausting portion SH may have a height W3 ranging from 3.0 mm to 8.00 mm. In the case where the height W3 of the exhausting portion SH is less than 3.0 mm, it may be necessary to more frequently perform a cleaning process for removing the remaining solutions and the contamination materials, which are transported into the exhausting portion SH, and this may lead to deterioration in productivity of the printing process. In the case where the height W3 of the exhausting portion SH is greater than 8.0 mm, the lower jig BZ may have an excessively large thickness in the third direction D3, which may lead to an unnecessary increase in space and deterioration in productivity of the CW jig ZG.

The upper jig CV may include a cover unit CU and a sidewall portion CB. The sidewall portion CB may extend in the third direction D3. The sidewall portion CB may enclose the lower jig BZ and may have a surface facing and enclosing a side surface of the lower jig BZ. The cover unit CU may laterally extend (along the second direction D2) from the sidewall portion CB. The cover unit CU may extend from the sidewall portion CB to have a portion that is overlapped with a portion of a top surface of the lower jig BZ. For convenience in illustration, the cover unit CU and the sidewall portion CB of the upper jig CV are depicted by a dotted line to be two different elements, but the cover unit CU and the sidewall portion CB may be a continuously connected (e.g., integrally formed) single element.

The cover unit CU may overlap the exhausting portion SH. Thus, when viewed in a plan view, the cover unit CU may cover the exhausting portion SH. As shown in FIG. 5, the cover unit CU may include an opening CU-O exposing the mounting portion SB. The opening CU-O may be defined by (may start from) a side surface CU-S of the cover unit CU, where the side surface CU-S is adjacent to the mounting portion SB. During the printing process, a solution may be sprayed on a surface of the cover window WD exposed through the opening CU-O.

According to an embodiment of the inventive concept, the side surface CU-S of the cover unit CU may be aligned with the mounting side surface SB-S of the mounting portion SB. The cover unit CU may be spaced apart from the lower jig BZ. Thus, a space, in which an airflow can be formed, may be provided between the cover unit CU and the lower jig BZ.

When measured in the third direction D3, the side surface CU-S of the cover unit CU may have a width W4 ranging from 0.5 mm to 1.5 mm. In the case where the width W4 of the cover unit CU is less than 0.5 mm, the cover unit CU may have a reduced strength or stiffness, and in this case, the cover unit CU may be deformed by a partial pressure applied during the printing process. In the case where the width W4 of the cover unit CU is greater than 1.5 mm, solution, which flows down along the side surface CU-S of the cover unit CU, may enter a region between the mounting side surface SB-S and the cover window WD and may lead to deterioration in reliability of the cover window WD.

In an embodiment, when measured in the third direction D3, a distance W5 from an imaginary line, which extends from a rear surface of the cover unit CU, to the rear surface WD-B of the cover window WD may range from 0.1 mm to 0.4 mm. In the case where the distance W5 is less than 0.1 mm, the distance W5 may be too small for solution to enter into the exhausting portion SH along the side surface CU-S of the cover unit CU, and in this case, remaining solution may be piled up along the edge of the cover window WD. In the case where the distance W5 is greater than 0.4 mm, solution, which flows down along the side surface CU-S of the cover unit CU, may enter a region between the mounting side surface SB-S and the cover window WD and may lead to deterioration in reliability of the cover window WD.

FIG. 7A illustrates an example, in which solution, which flows down along the side surface CU-S of the cover unit CU, is piled up (collected) in the exhausting portion SH due to an airflow that is produced by a partial pressure of a nozzle NZ during a printing process on the cover window WD.

The cover window WD may include a functional coating layer, which is formed by a printing process. The functional coating layer may include at least one of an anti-fingerprint layer, an anti-reflection layer, and/or a hard coating layer. However, the inventive concept is not limited to these examples, and if a functional layer is formed on the cover window WD by a printing process, the inventive concept can be applied to such a functional layer.

In the CW jig ZG according to an embodiment of the inventive concept, when a printing process is performed on the cover window WD, a solution may be sprayed onto the cover window WD through the nozzle NZ. In this case, the solution sprayed onto an edge portion of the cover window WD may flow down along the side surface CU-S of the cover unit CU and may be piled up (collected) in the exhausting portion SH. According to an embodiment of the inventive concept, the cover unit CU and the lower jig BZ may be spaced apart from each other to form a space, through which an airflow may pass. Furthermore, because the side surface CU-S of the cover unit CU is aligned (or substantially aligned) with the mounting side surface SB-S, the solution, which flows down along the side surface CU-S of the cover unit CU, may be easily piled up in the exhausting portion SH by an airflow produced by a partial pressure of the nozzle NZ.

Thus, the possibility of the solution sprayed through the nozzle NZ entering a region between the mounting side surface SB-S and the cover window WD may be prevented or reduced, and thus it may be possible to improve reliability of the cover window WD.

Referring to FIG. 7B, the cover unit CU may further include an inclined surface CU-C. The inclined surface CU-C may connect (e.g., extend from) the side surface CU-S of the cover unit CU to the rear surface of the cover unit CU. The inclined surface CU-C may be inclined from the side surface CU-S toward the exhausting portion SH, and thus, solution, which flows down along the side surface CU-S of the cover unit CU, may easily (e.g., efficiently) enter into the exhausting portion SH.

Figure 8A:
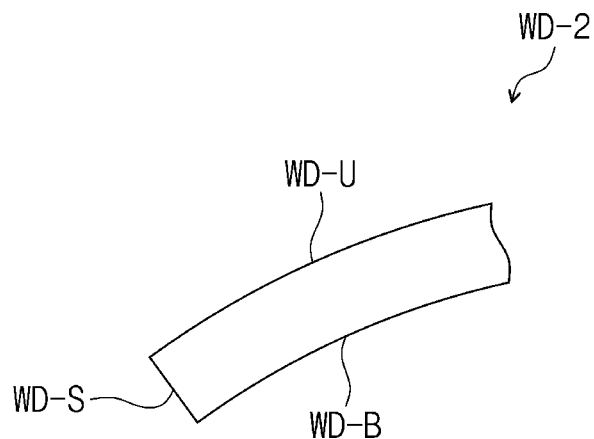
FIGS. 8A and 8B are sectional views illustrating a cover window according to an embodiment of the inventive concept.
Figure 8B:
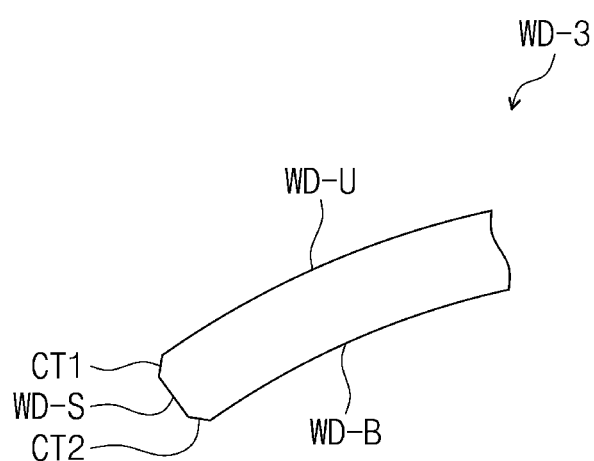

FIGS. 8A and 8B are sectional views illustrating a cover window according to other embodiments of the inventive concept.

Referring to FIG. 8A, a cover window WD-2 according to an embodiment of the inventive concept may include the front surface WD-U, the rear surface WD-B, and the side surface WD-S. The side surface WD-S may connect (e.g., extend from) the front surface WD-U to the rear surface WD-B. In an embodiment, the front surface WD-U of the cover window WD-2 may include a curved surface whose curvature is defined by a specific (or set) curvature radius. The rear surface WD-B of the cover window WD-2 may also include a curved surface whose curvature is defined by substantially the same curvature radius as that of the front surface WD-U. Thus, the cover window WD-2 may have a curved shape with a specific (or set) curvature.

Referring to FIG. 8B, a cover window WD-3 may be substantially similar to the cover window WD-2, except it may further include inclined surfaces CT1 and CT2. The inclined surfaces CT1 and CT2 may extend along an edge of the cover window WD-3. The inclined surfaces CT1 and CT2 may connect at least one of the front surface WD-U and the rear surface WD-B to the side surface WD-S. For example, a first inclined surface CT1 may connect the front surface WD-U to the side surface WD-S. A second inclined surface CT2 may connect the rear surface WD-B to the side surface WD-S.

In an embodiment, because the cover window WD-3 includes the inclined surfaces CT1 and CT2 formed along the edge thereof, it may be possible to prevent or reduce an external impact from being concentrated on an edge and/or corner region of the cover window WD-3. Thus, it may be possible to improve the durability of the cover window WD-2.

Figure 9:
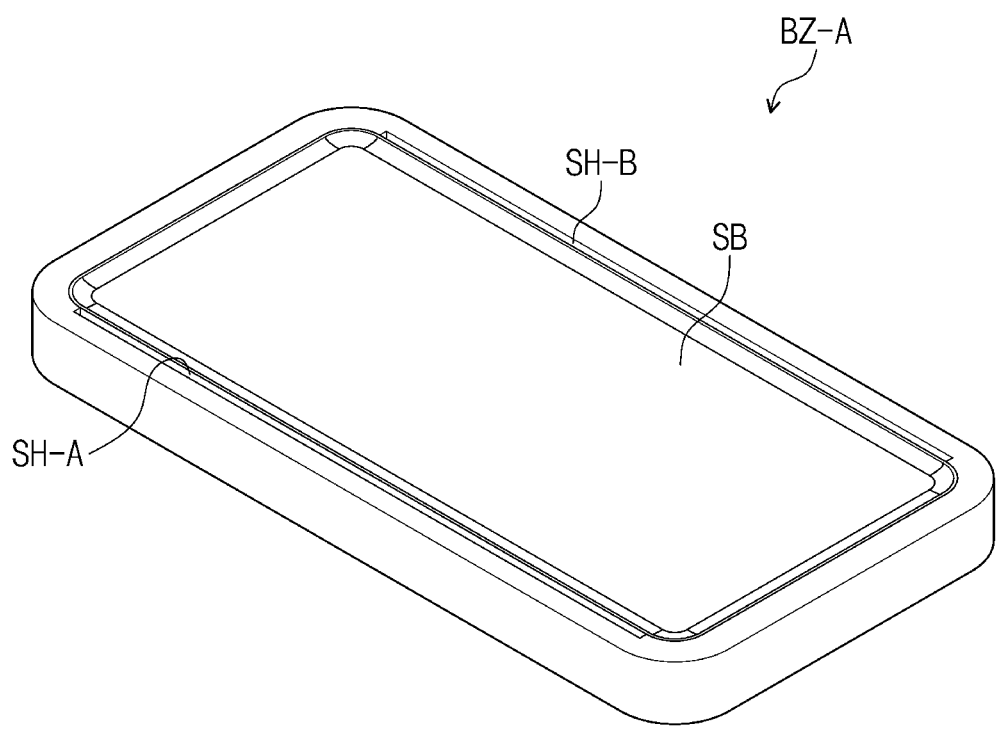
FIG. 9 is a perspective view illustrating a portion of a CW jig according to an embodiment of the inventive concept.
Figure 9:
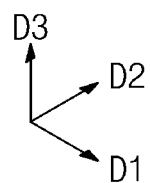

FIG. 9 is a perspective view illustrating a portion of a CW jig according to an embodiment of the inventive concept. For concise description, a detailed description of the same features as those described in connection with the lower jig BZ of FIG. 5 will not be provided again.

Referring to FIG. 9, a lower jig BZ-A may include a first exhausting portion SH-A and a second exhausting portion SH-B. The first exhausting portion SH-A and the second exhausting portion SH-B may be spaced apart from each other in the second direction D2 with the mounting portion SB interposed therebetween. The first exhausting portion SH-A and the second exhausting portion SH-B may each independently extend in the first direction D1.

Although FIG. 9 illustrates the first exhausting portion SH-A and the second exhausting portion SH-B, which are spaced apart from each other with the mounting portion SB interposed therebetween, the inventive concept is not limited to this example. For example, the exhausting portions SH-A and SH-B may have any suitable shape, depending on the usage purpose of the cover window WD, so long as the exhausting portions SH-A and SH-B are spaced apart from the mounting portion SB and have a groove formed by recessing a portion of the lower jig BZ-A in the third direction D3.

Figure 10:
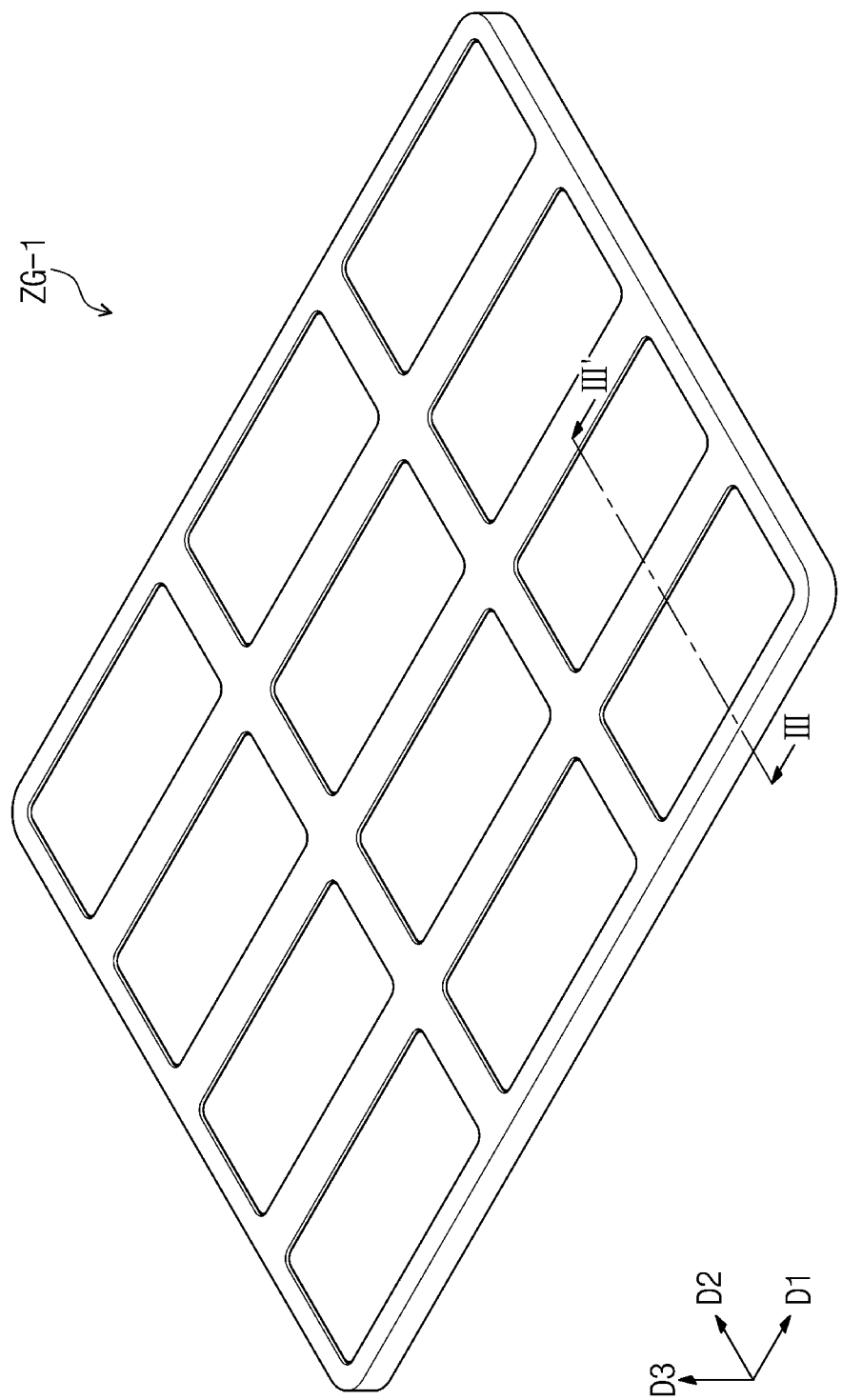
FIG. 10 is a perspective view illustrating an assembled structure of a CW jig according to an embodiment of the inventive concept.
Figure 11:
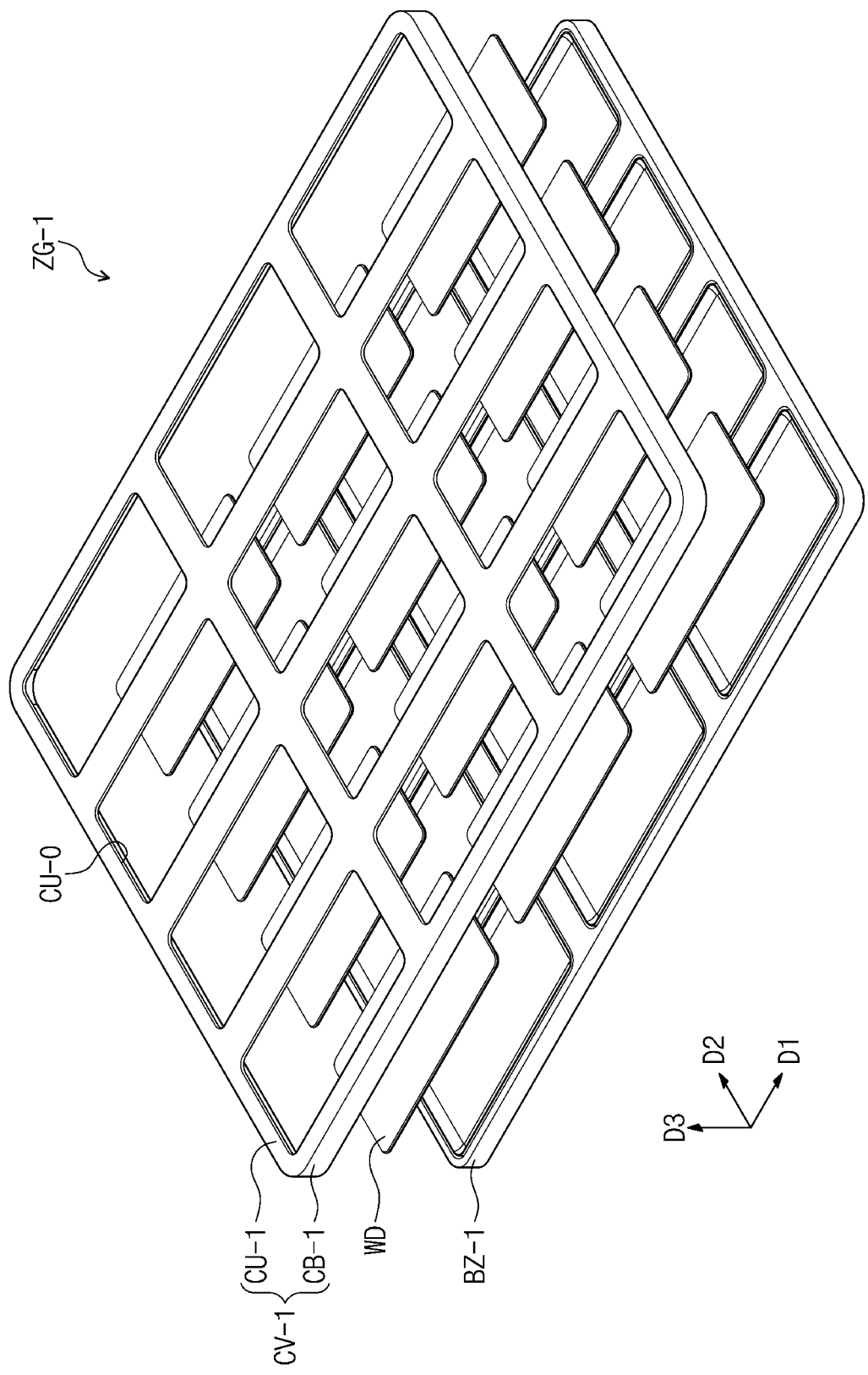
FIG. 11 is an exploded perspective view illustrating a CW jig according to an embodiment of the inventive concept.

FIG. 10 is a perspective view illustrating an assembled structure of a CW jig according to an embodiment of the inventive concept. FIG. 11 is an exploded perspective view illustrating a CW jig according to an embodiment of the inventive concept. FIG. 12 is a sectional view taken along a line III-III' of FIG. 10. For concise description, elements previously described with reference to FIGS. 1 to 7B may be identified by the same reference numbers, without repeating an overlapping description thereof.

Referring to FIGS. 10 and 11, a CW jig ZG-1 may include a lower jig BZ-1 and an upper jig CV-1. For convenience in description, the cover windows WD, along with the CW jig ZG-1, are illustrated in FIG. 11. The cover windows WD may be disposed between the lower jig BZ-1 and the upper jig CV-1, during a printing process. In an embodiment, the CW jig ZG-1 may be configured to accommodate a plurality of cover windows WD. For example, the lower jig BZ-1 may include mounting portions, on which the cover windows WD are respectively disposed (positioned), and the upper jig CV-1 may include openings CU-O exposing the respective cover windows WD.

FIGS. 10 and 11 illustrate the cover windows WD, which are arranged in a 3×4 matrix shape, but the inventive concept is not limited to the numbers of columns and rows of the cover windows WD.

Although only two cover windows WD1 and WD2 of the CW jig ZG-1 are exemplarily illustrated in FIG. 12, the following description may be applied to other cover windows in the CW jig ZG-1 in the same manner.

The lower jig BZ-1 may include mounting portions SB1 and SB2 and exhausting portions SH1 and SH2.

A first mounting portion SB1 and a second mounting portion SB2 may be spaced apart from each other. A first cover window WD1 may be disposed on the first mounting portion SB1, and a second cover window WD2 may be disposed on the second mounting portion SB2.

A first exhausting portion SH1 may be disposed adjacent to the first mounting portion SB1. The first exhausting portion SH1 may be spaced apart from the first mounting portion SB1 and may have a shape enclosing the first mounting portion SB1. When viewed from the third direction D3 (or in plan view), a second exhausting portion SH2 may be spaced apart from the second mounting portion SB2 and may have a shape enclosing (e.g., to surround) the second mounting portion SB2. Thus, a partition wall delimiting the first and second exhausting portions SH1 and SH2 may be formed in the lower jig BZ-1.

The upper jig CV-1 may include a cover unit CU-1 and a sidewall portion CB-1. The sidewall portion CB-1 may extend in the third direction D3 along a side surface of the lower jig BZ-1 and may have a shape enclosing the side surface of the lower jig BZ-1.

The cover unit CU-1 may include a portion that is laterally extended (e.g., in the second direction D2) from the sidewall portion CB-1 and is overlapped with the exhausting portions SH1 and SH2. As shown in FIG. 10, the cover unit CU-1 may include the openings CU-O exposing the mounting portions SB1 and SB2. The openings CU-O may be formed to expose respective ones of the cover windows WD to the outside. In an embodiment, the openings CU-O may be arranged in a grid or matrix shape, but embodiments of the present disclosure are not limited thereto. The openings CU-O may be defined (e.g., may extend) from the respective side surfaces CU-S of the cover unit CU-1 and may be adjacent to (e.g., may be aligned with) the mounting portions SB1 and SB2.

In an embodiment, the side surface CU-S of the cover unit CU-1 may be aligned with the respective one of first and second mounting side surfaces SB1-S and SB2-S of the mounting portions SB1 and SB2.

For example, the side surface CU-S of the cover unit CU-1 disposed on the first mounting side surface SB1-S of the first mounting portion SB1 may be aligned with the first mounting side surface SB1-S. Similarly, the side surface CU-S of the cover unit CU-1 disposed on the second mounting side surface SB2-S of the second mounting portion SB2 may be aligned with the second mounting side surface (SB2-S).

According to an embodiment of the inventive concept, the remaining (left-over) solutions and/or the contamination materials, which are produced during the printing process, may flow down along the respective side surface CU-S of the cover unit CU-1 and may be stored in the respective one of the exhausting portions SH1 and SH2. Thus, it may be possible to prevent or reduce the solution, which flows down along the side surface CU-S of the cover unit CU-1, from entering regions between the first and second mounting side surfaces SB1-S and SB2-S and the respective cover windows WD. Accordingly, it may be possible to improve reliability of the cover windows WD.

According to an embodiment of the inventive concept, a jig for a cover window may include an exhausting portion configured to collect remaining solutions and/or the contamination materials that may be generated during a printing process. In addition, a side surface of a mounting portion included in a lower jig may be aligned to and spaced apart from a side surface of a cover unit included in an upper jig, and thus, airflow may be formed (e.g., may pass through) a space between the lower jig and the upper jig.

Accordingly, solution, which is used in the printing process, may flow down along the side surface of the cover unit and may be accumulated in an exhausting portion, and this may make it possible to fabricate a highly reliable cover window.

While example embodiments of the inventive concept have been particularly shown and described herein, it will be understood by those of ordinary skill in the art that variations in form and detail may be made therein without departing from the spirit and scope of the present invention as defined by the attached claims and equivalents thereof.

What is claimed is:

1. A jig for a cover window, the jig comprising:
a lower jig comprising a mounting portion, on which a cover window is configured to be disposed, and an exhausting portion, adjacent to the mounting portion; and
an upper jig coupled with the lower jig, the upper jig comprising a cover unit, in which an opening exposing the mounting portion is defined, and a sidewall portion, coupled to the cover unit and enclosing the lower jig,
wherein the cover window comprises a front surface facing the mounting portion, a rear surface opposite the front surface, and a side surface between the front surface and the rear surface, and
wherein the mounting portion comprises a mounting surface facing the front surface of the cover window and a side surface facing the side surface of the cover,
wherein the cover unit is spaced apart from and extends over the exhausting portion and overlapping with the side surface of the mounting portion.

2. The jig of claim 1, wherein the side surface of the mounting portion is aligned with a side surface of the cover unit, the side surface of the cover unit defining a boundary of the opening.

3. The jig of claim 2, wherein a width of the side surface of the cover unit ranges from 0.5 mm to 1.5 mm.

4. The jig of claim 1, wherein a height of the exhausting portion ranges from 3.0 mm to 8.0 mm.

5. The jig of claim 1, wherein a width of the exhausting portion ranges from 1.0 mm to 3.0 mm.

6. The jig of claim 1, wherein
at least a portion of the front surface of the cover window comprises a curved surface with a set curvature radius.

7. The jig of claim 6, wherein the rear surface of the cover window comprises a curved surface having a same curvature radius as that of the front surface.

8. The jig of claim 6, wherein the cover unit comprises a rear surface coupled to the side surface of the cover unit and facing the lower jig, and
a distance from an imaginary line, which extends from the rear surface of the cover unit, to the rear surface of the cover window ranges from 0.1 mm to 0.4 mm.

9. The jig of claim 8, wherein the cover unit further comprises an inclined surface connecting the side surface of the cover unit to the rear surface of the cover unit and extending toward the exhausting portion.

10. The jig of claim 6, wherein the cover window further comprises an inclined surface extending along an edge of the cover window, and
the inclined surface connects at least one of the front surface and rear surface of the cover window to the side surface thereof.

11. The jig of claim 1, wherein the exhausting portion has a rectangular shape, when viewed in a sectional view.

12. The jig of claim 1, wherein the exhausting portion has a closed line shape enclosing the mounting portion when viewed in a plan view.

13. A jig for a cover window, the jig comprising:
a lower jig comprising a mounting portion, on which a cover window is configured to be disposed, and an exhausting portion, adjacent to the mounting portion; and
an upper jig overlapping the exhausting portion, the upper jig comprising a cover unit, in which an opening exposing the mounting portion is defined, and a sidewall portion coupled to the cover unit and enclosing the lower jig,
wherein the cover window comprises a front surface facing the mounting portion, a rear surface opposite the front surface, and a side surface between the front surface and the rear surface, and
wherein the mounting portion comprises a mounting surface facing the front surface of the cover window and a side surface facing the side surface of the cover window,
wherein the cover unit is spaced apart from the lower jig and overlaying the exhausting portion and the side surface of the mounting portion.

14. The jig of claim 13, wherein the side surface of the mounting portion is aligned with a side surface of the cover unit, the side surface of the cover unit defining a boundary of the opening.

15. The jig of claim 13, wherein
at least a portion of the front surface of the cover window comprises a curved surface with a set curvature radius.

16. The jig of claim 15, wherein the rear surface of the cover window comprises a curved surface having a same curvature radius as that of the front surface.

17. The jig of claim 13, wherein the exhausting portion encloses the mounting portion and comprises a groove formed by removing a portion of the lower jig in a depth direction of the lower jig.

18. A jig for a cover window, the jig comprising:
a lower jig comprising a plurality of mounting portions spaced apart from each other, and a plurality of exhausting portions respectively adjacent to the mounting portions; and
an upper jig comprising a sidewall portion enclosing the lower jig and a cover unit laterally extending from the sidewall portion, the cover unit comprising a plurality of openings exposing the respective mounting portions,
wherein the exhausting portion is overlapped with the cover unit, and
wherein each of the plurality of mounting portions is formed integrally with a corresponding one of the plurality of exhausting portions, the exhausting portion comprising a groove formed by removing a portion of the lower jig in a depth direction of the lower jig.

19. The jig of claim 18, wherein a side surface of the mounting portion is spaced apart from and aligned with a side surface of the cover unit, the side surface of the cover unit defining a boundary of the respective one of the plurality of openings.

20. The jig of claim 19, wherein the plurality of openings of the cover unit are arranged in a grid shape.

* * * * *